United States Patent
Visser et al.

(10) Patent No.: US 7,224,188 B2
(45) Date of Patent: May 29, 2007

(54) LINE DRIVER WITH REDUCED INTERFERENCE

(75) Inventors: Ruurd Anne Visser, Nijmegen (NL); Cecilius Gerardus Kwakernaat, Nijmegen (NL); Cornelis Klaas Waardenburg, Nijmegen (NL)

(73) Assignee: NXP B. V., Eindhoven (NL)

( * ) Notice: Subject to any disclaimer, the term of this patent is extended or adjusted under 35 U.S.C. 154(b) by 27 days.

(21) Appl. No.: 10/556,250

(22) PCT Filed: May 12, 2004

(86) PCT No.: PCT/IB2004/050654

§ 371 (c)(1),
(2), (4) Date: Nov. 10, 2005

(87) PCT Pub. No.: WO2004/102911

PCT Pub. Date: Nov. 25, 2004

(65) Prior Publication Data

US 2007/0018687 A1    Jan. 25, 2007

(30) Foreign Application Priority Data

May 16, 2003 (EP) .................................. 03101383

(51) Int. Cl.
*H03K 19/094* (2006.01)
*H03K 19/0175* (2006.01)

(52) U.S. Cl. ............................ 326/86; 326/90; 326/26; 326/27

(58) Field of Classification Search ............ 326/21–24, 326/26–27, 30–34, 86, 90; 327/108–112
See application file for complete search history.

(56) References Cited

U.S. PATENT DOCUMENTS 5,739,707 A * 4/1998 Barraclough ................. 327/112
6,154,061 A   11/2000 Boezen et al.
6,977,534 B2* 12/2005 Radelinow ................... 327/112

FOREIGN PATENT DOCUMENTS

WO    WO 02/37780 A2    5/2002

* cited by examiner

*Primary Examiner*—Anh Q. Tran

(57) ABSTRACT

A bus communication system contains a pair of communication conductors and a driver. The driver contains a plurality of pairs of controlled current source circuit, each pair comprising current source circuits of a first and second, mutually opposite polarity, and a control circuit for matching currents drawn by the current sources in each pair. The current source circuit of the first polarity have outputs coupled to a first one of the communication conductors, the current source circuits of the second polarity have outputs coupled to a second one of the communication conductors. A delay line is provided, with taps coupled to control inputs of the current sources of the first and second polarity, so that the pairs are switched on successively with mutual delays between successive pairs, as determined by the delay line.

8 Claims, 3 Drawing Sheets

LINE DRIVER WITH REDUCED INTERFERENCE

This application is a 371 of PCT/IB04/50654 filed on May 12, 2004.

The invention relates to data communication via a symmetrical pair of conductors, a communication bus system that communicates via such a pair of conductors and to a transmitting device for use in a communication bus system.

PCT patent application No. WO 02/37780 describes a line driver for a bus system that uses a pair of "wires" to communicate data. The line driver drives the pair of "wires" differentially. Differential driving has the advantage that the signals on the wires cause little electromagnetic interference, when they carry a time constant common-mode signal.

WO 02/37780 notes that, even if the wires are driven symmetrically on average, differences between speed with which the drivers drive different wires in mutually opposite direction can be the cause of interference, due to transitory mismatches. WO 02/37780 provides a delay line that is made up of a chain of inverters. Resistors couple the taps of the inverters to the wires. Outputs of successive inverters are alternately coupled to alternate ones of the wires. Thus, the signal transitions on the wires are composed of a series of small steps that are matched in size. As a result better matching of the transitions on the wires is realized.

The line driver of WO 02/37780 has the problem that it still produces interference, because the variations in the common mode of the wires, although reduced by using the delay line, still varies due to differences between the driving strengths of the drivers when the output impedance of the inverters is not negligible compared to the impedance of the resistors. However, making the inverters so strong that their output impedance is negligible compared to the impedance of the resistors would make the inverters impractically large. Moreover, it would affect the delay of the delay chain.

U.S. Pat. No. 6,154,061 similarly concerns a driver for a pair of wires in a communication bus. Here the problem of differences between the signals on the wires is addressed by providing two current sources that supply equal sized currents of opposite polarity to the respective wires. The current sources are controlled by a current mirror technique, that is, the control inputs of the respective current sources are also coupled to control inputs of reference current sources and the output of the reference current sources is coupled back to the control inputs. Data to be transmitted is used to control the set current to which the currents from both the reference current sources are regulated by the feed back circuit.

As a result, the currents supplied to both wires are generally equal because they dynamically track the same set current. However this feedback mechanism does not ensure that the currents match at the highest frequencies that are most significant for interference.

Among others, it is an object of the invention to reduce electromagnetic interference from a pair of communication conductors.

The invention provides for a system according to claim 1. The current to the pair of wires is switched on in steps, using successive pairs of controlled current sources that are controlled so that they supply matching currents. The current sources of the pair supply currents of opposite polarity to respective ones of the current communication conductors. Thus, the currents are not dependent on the voltage drops over resistors that conduct the current to the wires, as is the case in WO 02/37780.

In principle, any way of controlling the currents may be used. In one embodiment, current mirror circuits are used to ensure current matching, wherein the same reference current is supplied to respective current mirror input circuits for the different polarities and wherein the current mirror input circuits control currents through current source transistors in the different controlled current sources.

In this embodiment the mechanism for switching the currents on and off may be part of the feedback loop of the current mirrors, as is the case in U.S. Pat. No. 6,154,061, but in a further embodiment a switchable driver circuit is coupled between the output of the current mirror input circuit (that may contain a feedback loop, which is then unaffected by switching) and the current source transistor. Thus, the feedback mechanism of the current mirror input circuit is hardly affected by switching and dynamic current matching is ensured by the steps.

In a further embodiment a common cascode transistors is included between the outputs of a plurality of the current source transistors on one hand and the bus communication conductor on the other hand. This reduces the parasitic effects.

In another embodiment, respective cascode transistors are used between individual ones of the current source transistors and the bus communication conductor, and the control electrodes of the cascode transistors are controlled to realize the successive steps.

These and other objects and other advantageous aspects of the invention will be described using the following Figs.:

Figure 1:
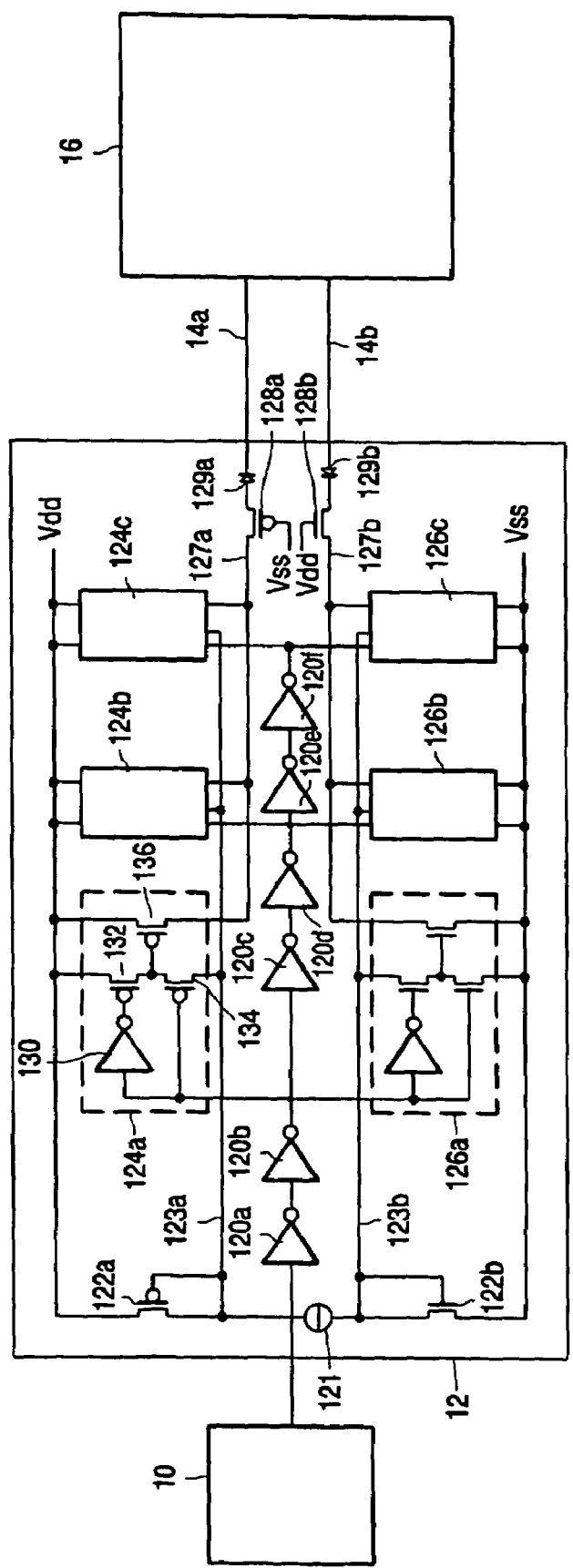
FIG. 1 shows a bus communication system

FIG. 1 shows a bus communication system, that contains a data source 10, a driver 12, communication conductors 14*a,b* and a receiving circuit 16. Data source 10 is coupled to an input of driver 12. Outputs of driver 12 are coupled to inputs of receiving circuit 16 via communication conductors. Data source 10 and receiver circuit 16 may be arranged for operation in a CAN bus system for example, which is known per se.

Driver 12 contains a delay circuit made up of a series of inverters 120*a–f*, a first and second of driver line 127*a,b*, a first plurality of current source stages 124*a–c* coupled to first driver line 127*a*, a second plurality of current source stages 126*a–c* coupled to second driver line 127*b*. Successive taps of the delay circuit, each time after a pair of successive inverters 120*a–f* are coupled to switch inputs of current source stages 124*a–c*, 126*a–c*. Driver lines 127*a,b* are coupled to communication conductors 14*a,b* each via a cascode transistor 128*a,b* and a diode 129*a,b*.

All current source stages 124*a–c*, 126*a–c* have a similar structure. Therefore only one of current source stages 124*a* of the first plurality and one of current source stages 126*b* of the second plurality is shown in detail, references being provided only for one of the current source stages 124*a*. This current source stage comprises a current source transistor 136 and a switching stage having an inverter 130, a pull-up transistor 132 and a pull down transistor 134. The main current channels of pull-up transistor 132 and pull down transistor 134 are coupled in series between a supply conductor Vdd and a reference conductor 123*a*. Control electrodes of pull-up transistor 132 and pull down transistor 134 are driven from a tap of the delay circuit via inverter 130 and directly respectively. Current source transistor 136 has a main current channel coupled between the power supply conductor Vdd and second driver line 127*a*. Current source transistor 136 has a control electrode coupled to a node between the main current channels of pull-up transistor 132 and pull-down transistor 134.

A reference circuit comprises a referent current source 121 and mirror input transistors 122*a, b*. The main current channels of mirror input transistors 122*a,b* are coupled in series with reference current source 121. Reference conductors 123*a,b* are coupled to respective nodes between the main current channels of the mirror input transistors and reference current source 121. Control electrodes of mirror transistors 122*a,b* are coupled to reference conductors 123*a, b*.

In operation data source 10 supplies signal that switches between two logic levels to inverters 120*a–f*. The signals are copied to switching inputs of current source stages 124*a–c*, 126*a–c*, so that transitions in the signal reach successive stages with increasing delay. When the signal supplied to a current source stage is logic low the control electrode of current source transistor 136 is coupled to reference conductor 123*a*. As a result current source transistor 136 draws a current controlled by the voltage on reference conductor 123*a*. This current is drawn from driver line 127*a*.

The voltage on reference conductor 136*a* is controlled by reference current source 121 and mirror input transistor 122*a*, so that the current drawn by current source circuit 124*a* is in a predetermined ratio to the current supplied by reference current source 121. When the signal is logic high current source circuit 124*a* draws no current.

Pairs of current source circuits (124*a*, 126*a*), (124*b*, 126*b*), (124*c*, 126*c*), that are receive a switching signals from the same tap of the delay line are dimensioned so that in each pair both current source circuits draw substantially equal current from driver lines 127*a,b*. As a result the currents drawn from different driver lines 127*a,b* are switched on or off symmetrically in successive steps. This avoids changes in the common mode current to driver lines 127*a,b*.

Although FIG. 1 shows three pairs of current source circuits 124*a–c*, 126*a–c*, it should be understood that in practice two pairs may be used, or a greater number than three, such as four etc or even twenty or more, with a correspondingly greater number of inverters 10*a–f* in the delay circuit, so that each pair switches on with a different delay. The more current source stages the less mismatch between the dynamic currents. With twenty stages and minimal delays an overall switching time of twenty nanoseconds may be realized for example on communication conductors 14*a,b*.

Cascode transistors 128*a* pass current between driver lines 127*a,b* (127 ?) and communication conductors 14*a,b*. Cascode transistors 128*a,b* present a low impedance to driver lines 137*a,b* reducing asymmetry due to parasitic effects in driver circuit 12 and presenting a high impedance to communication conductors 14*a,b*. Diodes 129*a,b* are provided in series with the main current channels of cascode transistors 128*a,b* coupled to communication conductors 14*a,b* to prevent bus clamping.

Figure 2:
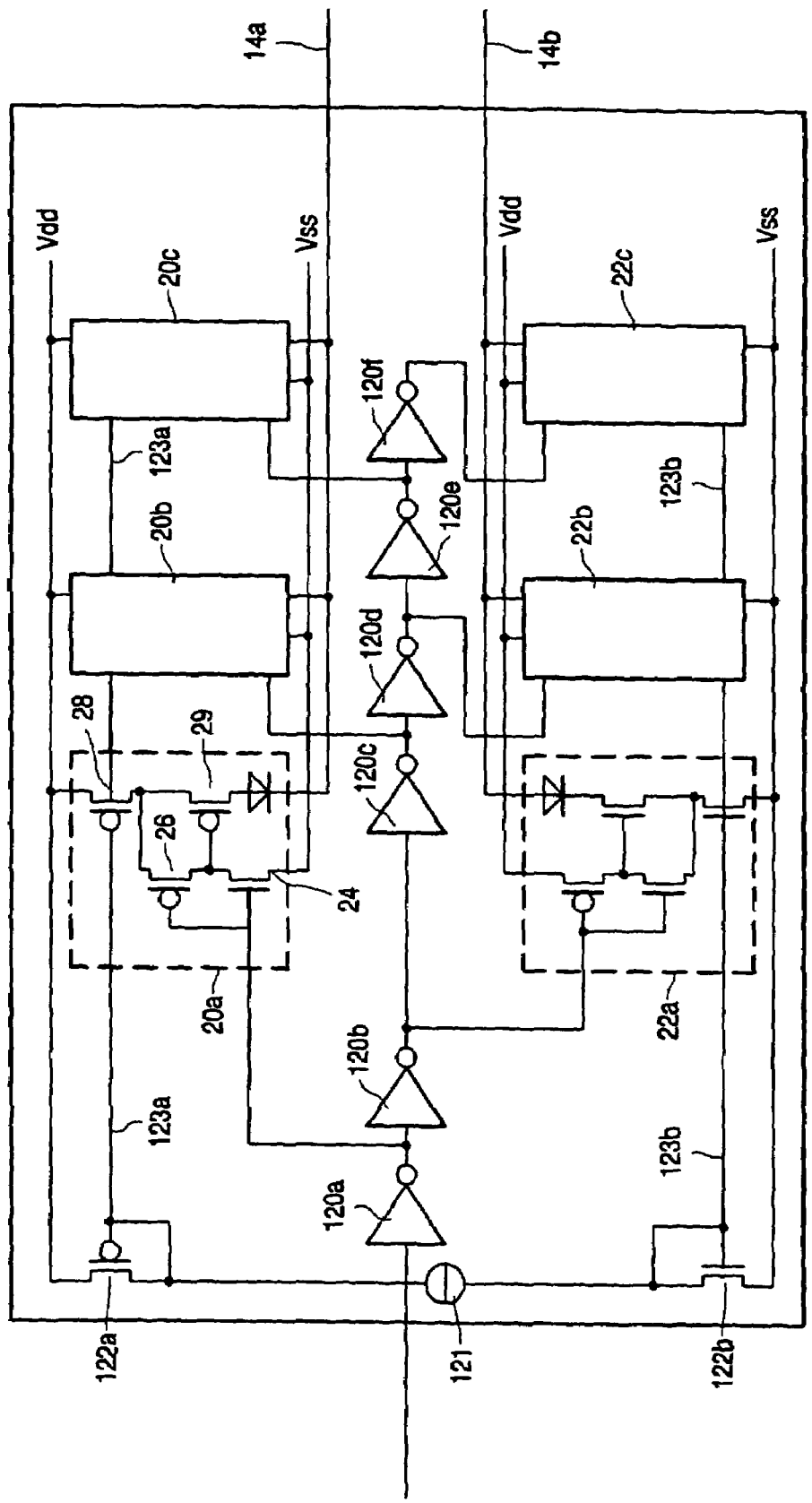
FIG. 2 shows an embodiment of a line driver for a wire pair

FIG. 2 shows an alternative embodiment of driver circuit 12. In this embodiment cascode transistors 29 are included in current source stages 20*a–c*, 22*a–c*, with their main current channel in series with the main current channel of current source transistor 28. An inverter circuit 24, 26 in current source stages 20*a–c*, 22*a–c* drives the control electrode transistor 29. This inverter circuit comprises a series connection of the main current channels of complementary transistors coupled between a node between the main current channels of cascode transistor 29 and current source transistor 28 and power supply connection Vss. The control electrodes of the transistors in the inverters are coupled to taps of the delay circuit, alternate taps being coupled to current source stages that drive alternate ones of communication conductors 14*a,b*. In this embodiment the drive strength of the circuits have been tuned relative to one another so that sources 20*a*, 22*b* are switched on substantially simultaneously, as are sources 20*b*, 22*b* and so on.

In operation cascode transistors 29 of successive stages 20*a–c*, 22*a–c* are switched on or off successively under control of inverters 120*a–f*. By using individual cascode transistors area may be saved, in particular when cascode transistor 29 has to be made large to accommodate a large voltage drop.

Although the invention has been illustrated with two particularly advantageous types of current source stages it will be understood that other types of switchable controlled current source may be used instead of the stages. Similarly, although a chain of inverters has been used to implement the delay circuit, it will be understood that different types of delay circuits may be used instead.

Figure 3:
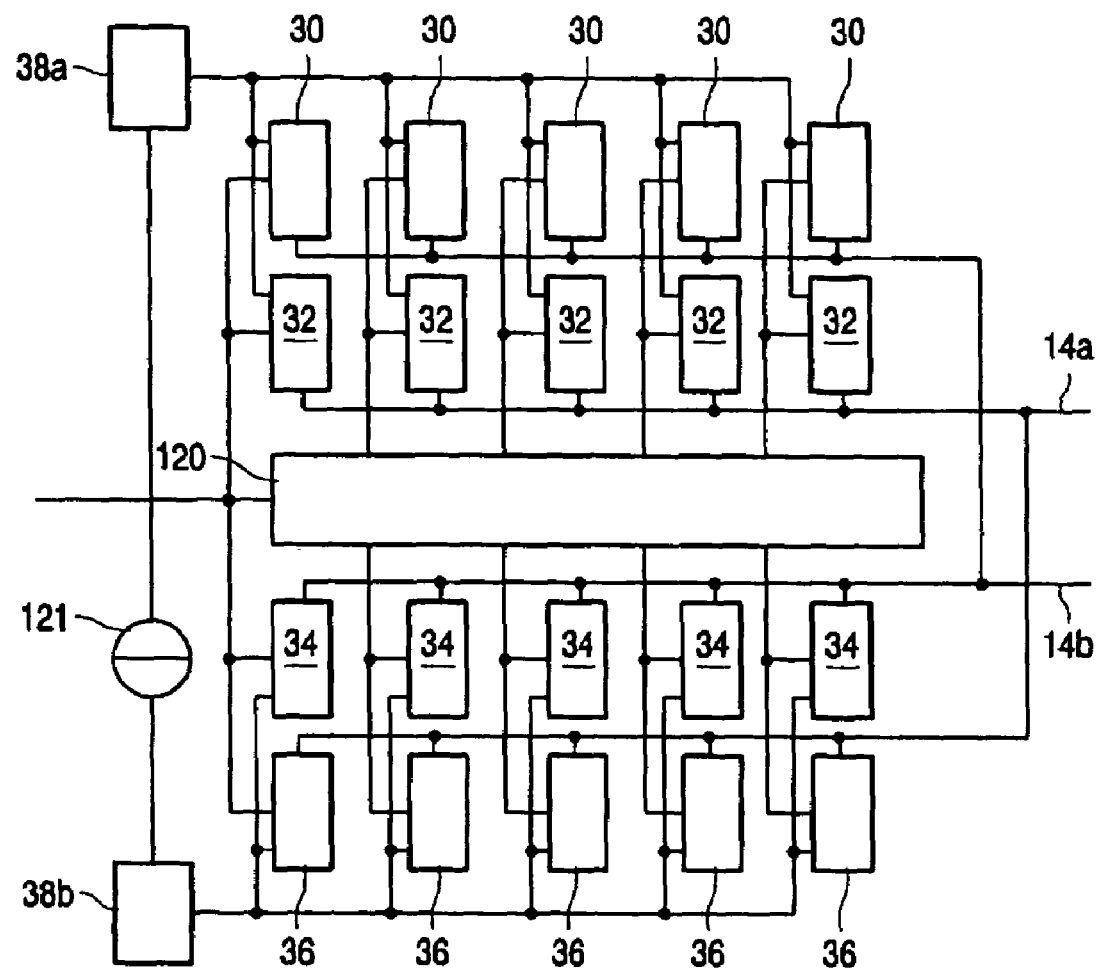
FIG. 3 shows another embodiment of a line driver for a wire pair

FIG. 3 shows a driver circuit that provides for driving each communication conductor 14*a,b* with either one of two different polarities. The driver circuit contains a delay circuit 120, a common current source 121, positive and negative current control circuits 38*a,b*, a plurality of first current source stages 30 of a first polarity, a plurality of second current source stages 32 of the first polarity, a plurality of third current source stages 34 of a second polarity, a plurality of fourth current source stages 36 of the second polarity. Common current source 121 is coupled to both positive and negative current control circuits 38*a,b*, which have outputs coupled to the first and second current source stages and the third and fourth current source stages respectively.

First current source stages 30 and third current source stages 34 have outputs coupled to first communication conductor 14*a*. Second current source stages 32 and fourth current source stages 36 have outputs coupled to second communication conductor 14*b*. Successive ones of the first current source stages 30 are switch on and off successively from delay circuit 120. The same holds for the second, third and fourth current source stages. The circuit is arranged so that first and third current source stages 30, 34 switch on an off in substantially complementary manner. This may be realized for example by using outputs of delay chain 120 with appropriate signal polarity. The same holds for second and fourth current source stages 32, 36. Current source stages 30, 32, 34, 36 of FIG. 3 may be implemented as shown in FIGS. 1 and 2, using common current mirror input circuits as current control circuits 38*a,b*. Alternatively separate pairs of control circuits may be used for first and third current source stages 30, 34 and for second and fourth current source stages 32, 36 respectively. In an embodiment a slight relative delay may be provided between the complementary current sources, which is sufficient to avoid temporal overlap of current supply of opposite polarities to a same communication conductor from pairs of current sources that switch on under control of the same tap of the delay line.

Although the invention has been described in terms of specific embodiments it will be realized that the invention is not limited to these embodiments. For example, instead of a pair of common current mirror input circuits for controlling the control electrode of all current source transistors one may of course use separate pairs of current mirror input circuits, or indeed other types of circuits that ensure matched currents, for individual pairs of current sources that are switched on substantially simultaneously, or for groups of pairs of current sources.

As another example, instead of switches between the current mirror input circuits and the current source transistors, or between the current source transistors and the communication conductors (as shown in the Figs.), switches in such individual current mirror input circuits may be used to realize the data dependence.

The invention claimed is:

1. A bus communication system comprising:
a pair of communication conductors (14*a,b*);
a driver (12), comprising a delay line (120*a–f*), a plurality of pairs of controlled current source circuits (124*a–c*, 126*a–c*), each pair comprising current source circuits (124*a–c*, 126*a–c*, 20*a–c*, 22*a–c*) of a first and second, mutually opposite polarity, and a control circuit (121, 122*a,b*) for matching currents drawn by the current source circuits (124*ac*, 126*a–c*, 20*a–c*, 22*a–c*) in each pair, the delay line (120*a–f*) having taps coupled to control inputs of the current source circuits (124*a–c*, 126*a–c*, 20*a–c*, 22*a–c*) of the first and second polarity in the plurality of pairs, so that the current source circuits (124*a–c*, 126*a–c*, 20*a–c*, 22*a–c*) are switched on with mutual delays between successive pairs determined by the delay line (120*a–f*), the current source circuits (124*a–c*, 20*a–c*) of the first polarity having outputs coupled to a first one of the communication conductors (14*a*), the current source circuits of the second polarity (126*a–c*, 22*a–c*) having outputs coupled to a second one of the communication conductors (14*b*).

2. A bus communication system according to claim 1, wherein the control circuit (121, 122*a,b*) comprises a first and second current mirror input circuit (122*a,b*), with inputs coupled to receive a same current, and outputs coupled to current control inputs of the current source circuits (124*a–c*, 126*a–c*, 20*a–c*, 22*a–c*) of the first and second polarity respectively, the current source circuits (124*a–c*, 126*a–c*) comprising current source transistors (136, 28), with main current channels coupled to the communication conductors (14*a,b*) and control electrodes coupled to the first and second one of the outputs of current mirror input circuits (122*a,b*) respectively.

3. A bus communication system according to claim 2, wherein each current source circuit of the first polarity (124*a–c*) comprises a driving circuit (130, 132, 134) coupled between the output of the first current mirror input circuit (122*a*) and the control electrode of the current source transistor (136), the driving circuit (130, 132, 134) having and an enable input coupled to the delay line (120*a–f*).

4. A bus communication system according to claim 2, comprising a cascode transistor (128*a*) with a main current channel coupled between a common connection between the main current channels of the current source transistors (136) of the current source circuits (124*a–c*) of the first plurality and the first one of the communication conductors (14*a*).

5. A bus communication system according to claim 2, wherein each current source circuit (14*a–c*) of the first polarity comprises a respective cascode transistor (29) with a main current channel coupled between the main current channel of the current source transistor (28) and the first one of the communication conductors (14*a*), and a control electrode coupled to the delay circuit (120*a–f*).

6. A bus communication system according to claim 5, wherein the current source circuits (20*a–c*) of the first plurality each comprise a driving stage (24, 26) between the delay circuit (120*a–f*) and the control electrode of the cascode transistor (29), each driving stage (24, 26) having power supply inputs coupled between a power supply connection (Vdd) and a node between the main current channels of the current source transistor (28) and the cascode transistor (29).

7. A bus communication system according to claim 1, wherein the driver comprises a further plurality of further pairs of controlled current source circuits (32, 34) of the first and second polarity, the controlled current source circuits (32, 34) of the first and second polarity in each further pair being coupled to the second and first communication conductor (14*a,b*) respectively, the control circuit (121, 122*a,b*) matching currents drawn by the further current source circuits (32, 34) in each further pair to the currents drawn by the current sources (30, 36) in a corresponding one of the pairs, each further controlled current source circuit (32, 34) in the further pairs being activated from the delay line (120*a–f*) substantially in phase opposition with the controlled current source circuits (30, 36) in the corresponding one of pairs that is connected to a same one of the communication conductors (14*a,b*).

8. A bus transmitter circuit for a bus communication system as claimed in claim 1, comprising a driver as claimed in claim 1.

* * * * *